United States Patent
Wang

(10) Patent No.: US 7,778,019 B2
(45) Date of Patent: Aug. 17, 2010

(54) SHOCK-ABSORBING STRUCTURE FOR ABSORBING SHOCK OF A DISPLAY PANEL AND RELATED DISPLAY DEVICE

(75) Inventor: Jih-Hsiang Wang, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 194 days.

(21) Appl. No.: 12/252,366

(22) Filed: Oct. 16, 2008

(65) Prior Publication Data
US 2009/0262487 A1 Oct. 22, 2009

(30) Foreign Application Priority Data
Apr. 22, 2008 (TW) ............................... 97206870 U

(51) Int. Cl.
*G06F 1/16* (2006.01)
(52) U.S. Cl. .................... 361/679.27; 349/58; 345/156; 362/97.2
(58) Field of Classification Search .................. 349/58, 349/59, 60, 110; 345/156, 157, 88, 679; 362/97.2; 361/679.01, 679.02, 679.08, 679.09, 361/679.23, 679.31, 679.27, 679.37, 679.59; 455/575.1, 575.5, 90.3; 312/223.1, 223.2, 312/223.3
See application file for complete search history.

(56) References Cited

U.S. PATENT DOCUMENTS

| | | | | |
|---|---|---|---|---|
| 7,466,540 | B2 * | 12/2008 | Takahashi et al. | 361/679.27 |
| 7,679,696 | B2 * | 3/2010 | Makino | 349/58 |
| 2003/0222850 | A1 * | 12/2003 | Hung | 345/156 |
| 2009/0168405 | A1 * | 7/2009 | Yoo et al. | 362/97.2 |

* cited by examiner

*Primary Examiner*—Hung V Duong
(74) *Attorney, Agent, or Firm*—Winston Hsu

(57) ABSTRACT

A shock-absorbing structure includes a housing including a base and a lateral wall connected to the base, and a fragment component for wedging with the lateral wall. The fragment component includes a first end and a second end. The shock-absorbing structure further includes a supporting component connected to a display panel for pressing the first end of the fragment component, and a frame installed on a side of the display panel for covering the display panel with the housing and for pressing the second end of the fragment component so that the fragment component supports the display panel elastically.

20 Claims, 5 Drawing Sheets

SHOCK-ABSORBING STRUCTURE FOR ABSORBING SHOCK OF A DISPLAY PANEL AND RELATED DISPLAY DEVICE

BACKGROUND OF THE INVENTION

1. Field of the Invention

The present invention relates to a shock-absorbing structure for absorbing shock of a display panel and related display device, and more particularly, to a shock-absorbing structure with a fragment component for absorbing shock of a display panel and related display device.

2. Description of the Prior Art

In the past, consumers have used desktop computers to process documents. However, since the desktop computers are heavy and hard to transport, users cannot process documents when they go out. As technology develops day-by-day, there are many kinds of portable computers such as notebook computers and personal digital assistants (PDAs) being developed. These popular portable computers are easy to carry out so that users can process documents conveniently when they are going out. However, since users are always carrying out the portable computers, the portable computers are usually in an environment with a lot of vibration. It is possible that the portable computers may fall down due to the carelessness of users. Therefore, the portable computers are easily damaged, especially liquid crystal display (LCDs) installed inside the portable computers. These LCDs are made of fragile material, and they cannot sustain great shock force. However, the LCDs make up an indispensable display interface of portable computers. Therefore, portable computers with buffers to absorb shock force are being developed by researchers.

For preventing damage of the LCD monitor of the portable computer, the elastomer, such as plastic or sponge, can be disposed inside the portable computer for absorbing shock force when the LCD monitor is shocked. However, the elastomers made of plastic or sponge can only absorb a little portion of shock force. Therefore, when the LCD monitor receives the shock force, a large portion of the shock force is still absorbed by the LCD monitor, and only a little portion of the shock force is absorbed by the elastomers. Although enlarging thickness can make the elastomers absorb more shock force, it will also increase the volume of the elastomers which will in turn increase the volume of the portable computer. Moreover, the characteristics of the plastic and the sponge change under high temperatures and a high moisture environment, thereby further influencing the ability to absorb shock force. In different kinds of portable computers, the material, weight, and strength of the LCD panel and PCB are also different. Therefore, designers must choose the proper characteristics such as coefficient of elasticity of elastomers to properly support the LCD monitor. However, the characteristics of the elastomers such as plastic or sponge must be changed through difficult manufacturing techniques. That is not convenient for producers. Therefore, the prior art buffer lacks flexibility, thereby increasing the cost of production.

SUMMARY OF THE INVENTION

According to the claimed invention, a shock-absorbing structure includes a housing including a base and a lateral wall connected to the base, and a fragment component for wedging with the lateral wall. The fragment component includes a first end and a second end. The shock-absorbing structure further includes a supporting component connected to a display panel for pressing the first end of the fragment component, and a frame installed on a side of the display panel for covering the display panel with the housing and for pressing the second end of the fragment component so that the fragment component supports the display panel elastically.

According to the claimed invention, a display device includes a housing including a base and a lateral wall connected to the base, a display panel installed inside the housing, and a fragment component for wedging with the lateral wall. The fragment component includes a first end and a second end. The display device further includes a supporting component connected to the display panel for pressing the first end of the fragment component, and a frame installed on a side of the display panel for covering the display panel with the housing and for pressing the second end of the fragment component so that the fragment component supports the display panel elastically.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
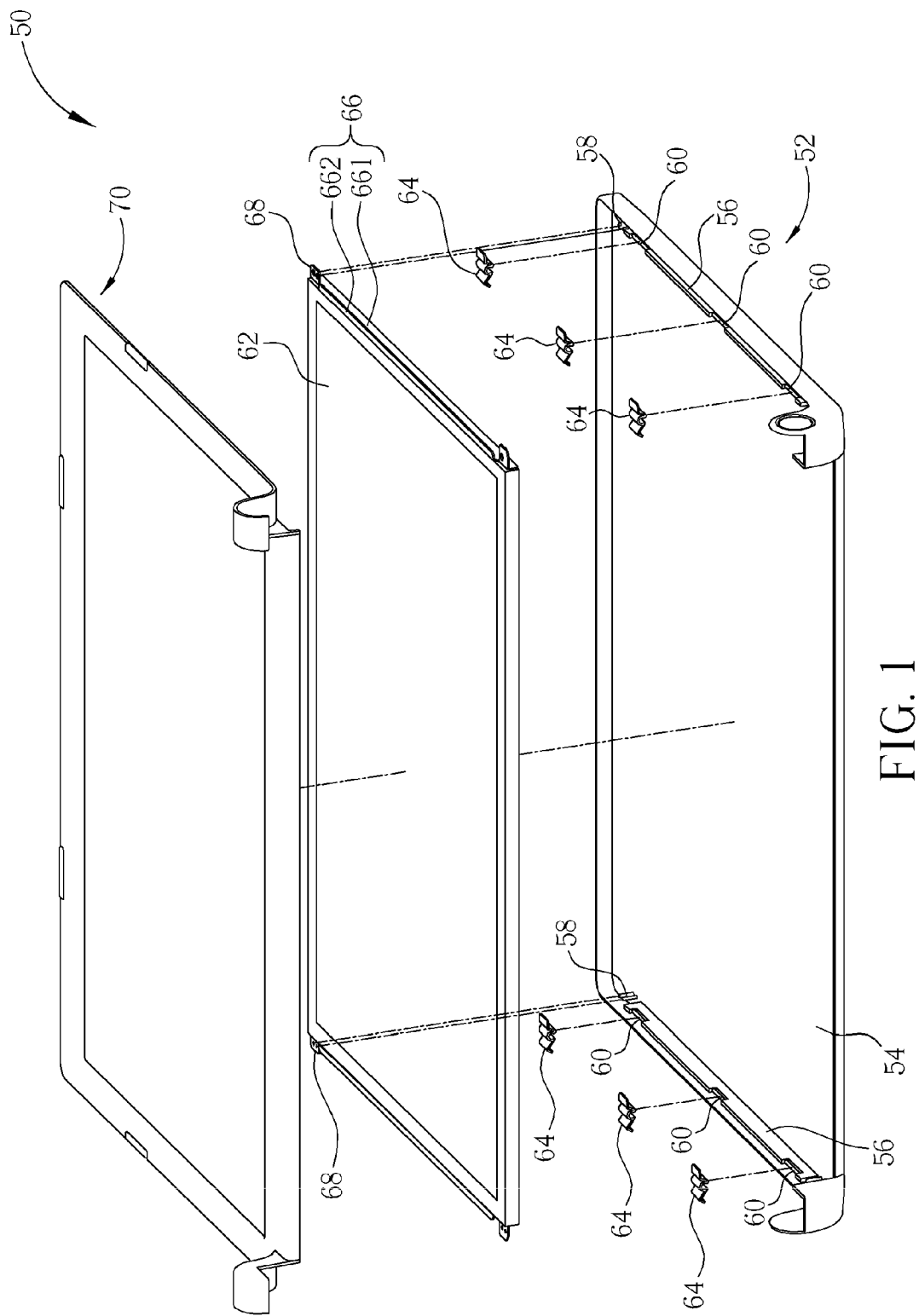
FIG. 1 is an exploded diagram of a display device according to a preferred embodiment of the present invention.

Please refer to FIG. 1. FIG. 1 is an exploded diagram of a display device 50 according to a preferred embodiment of the present invention. The display device 50 can be an LCD monitor applied for a portable computer. The display device includes a housing 52 including a base 54, at least one lateral wall 56 connected to the base 54, at least one pin 58 disposed on the base 54. The base 54 and the lateral wall 56 can be connected integratedly. The base 54 and the pin 58 also can be connected integratedly. At least one rod 60 is disposed on the lateral wall 56, and the rod 60 can be connected to the lateral wall 56 integratedly. The disposition and the number of the lateral wall 56, the pin 58, and the rod 60 are not limited to this embodiment. The display device 50 further includes a display panel 62 installed inside the housing 52. The display panel 62 can be an LCD panel.

The display device 50 further includes at least one fragment component 64 for wedging with the rod 60 of the lateral wall 56 pivotally. The fragment component 64 is made of elastic material, such as metal or plastic material. In different kinds of display devices, the material, weight, and strength of the LCD panel and PCB are also different. The disposition and the number of the fragments 64 can be designed accordingly so as to optimize shock-absorbing effect for customization. The display device 50 further includes at least one supporting component 66 connected to the display panel 62. The supporting component 66 includes a connecting part 661 connected to the display panel 62, and a pressing part 662 connected to the connecting part 661 perpendicularly. The connecting part 661 of the supporting component 66 can be screwed to the display panel 62, or the supporting component 66 and the display panel 62 can be connected integratedly. The supporting component 66 can be a metal frame or a plastic frame. The display device 50 further includes at least one positioning component 68 connected to the display panel 62 and located in a position corresponding to the pin 58. The pin 58 on the base 54 can be inserted into the positioning component 68 so as to constrain the display panel 62. The positioning component 68 can be screwed to the display panel 62, or the positioning component 68 and the display panel 62 can be connected integratedly. The display device 50 further includes a frame 70 installed above the display panel 62 for covering the display panel 62 with the housing 52 together.

Figure 2:
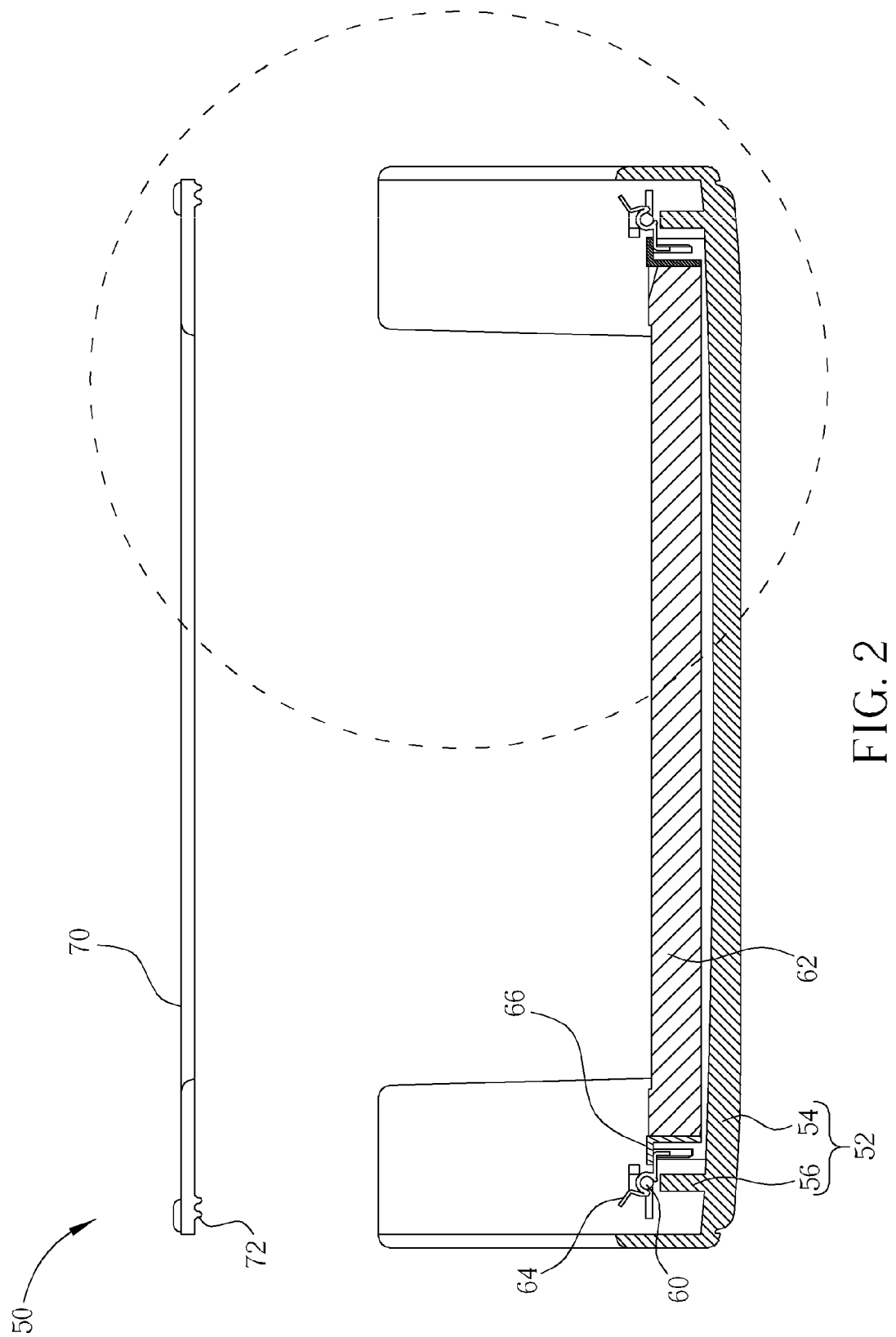
FIG. 2 is a sectional view of the display device when a frame has not been assembled with a display panel according to the preferred embodiment of the present invention.
Figure 3:
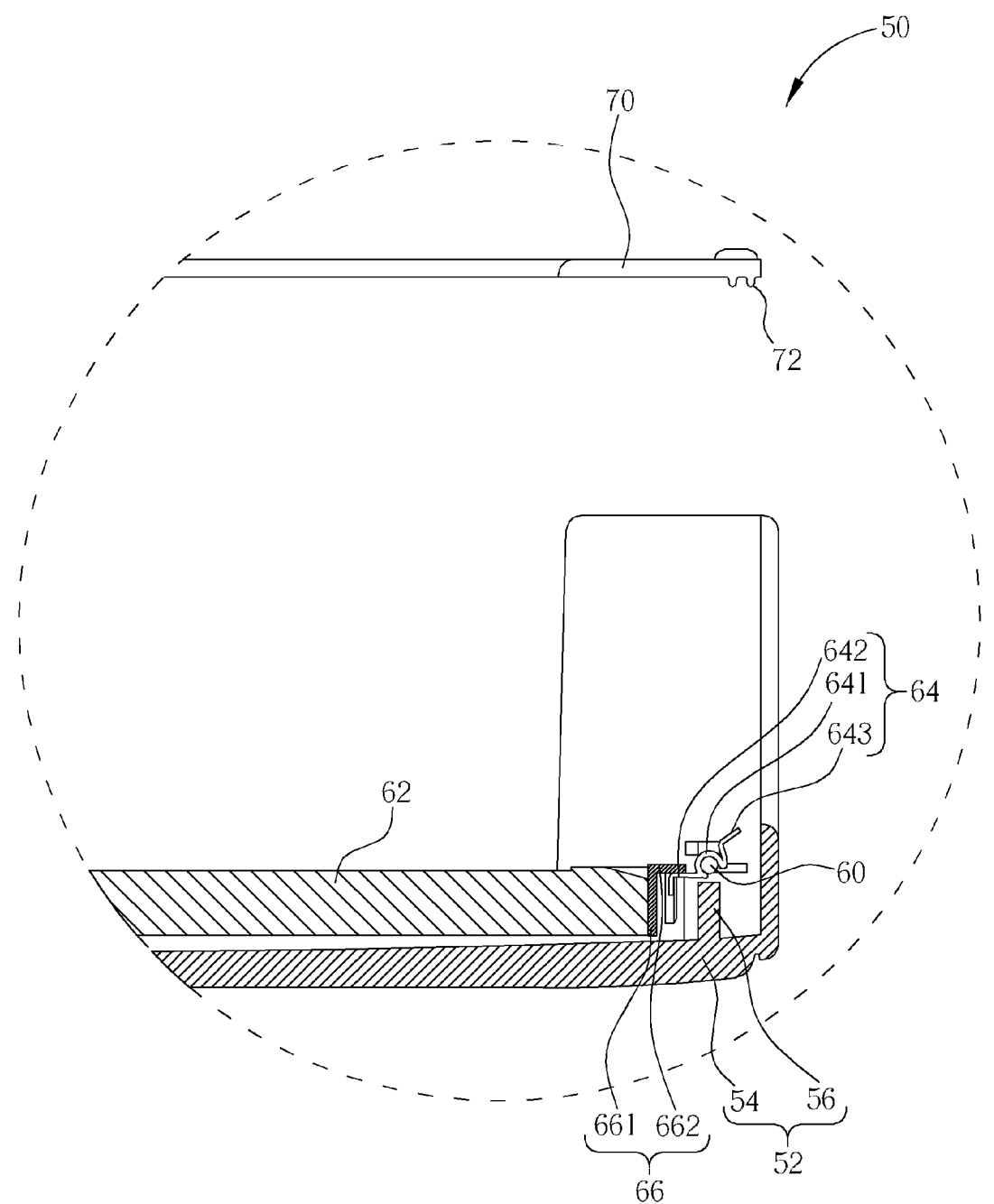
FIG. 3 is an enlarged diagram of FIG. 2.
Figure 4:
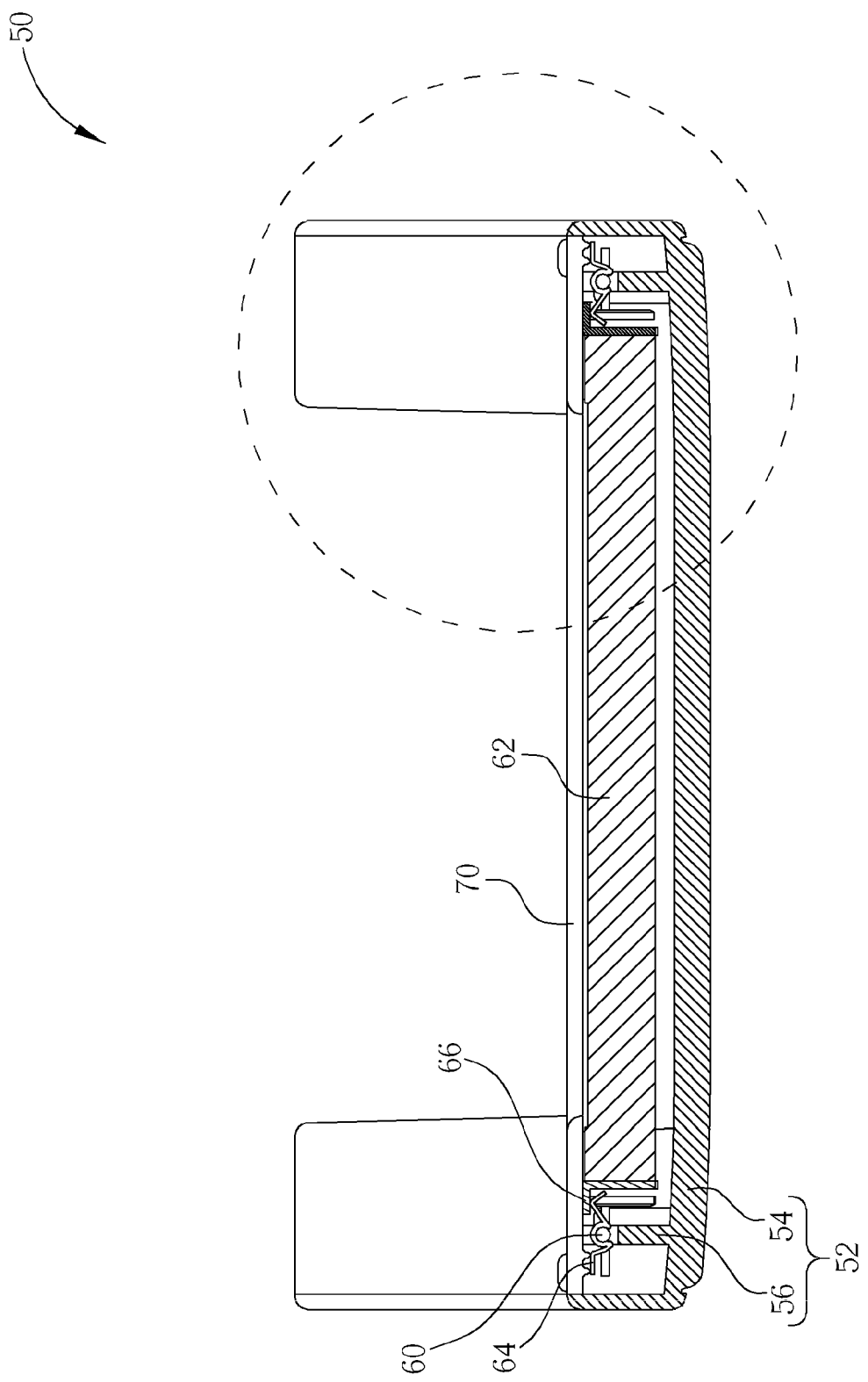
FIG. 4 is a sectional view of the display device when the frame is assembled with the display panel according to the preferred embodiment of the present invention.
Figure 5:
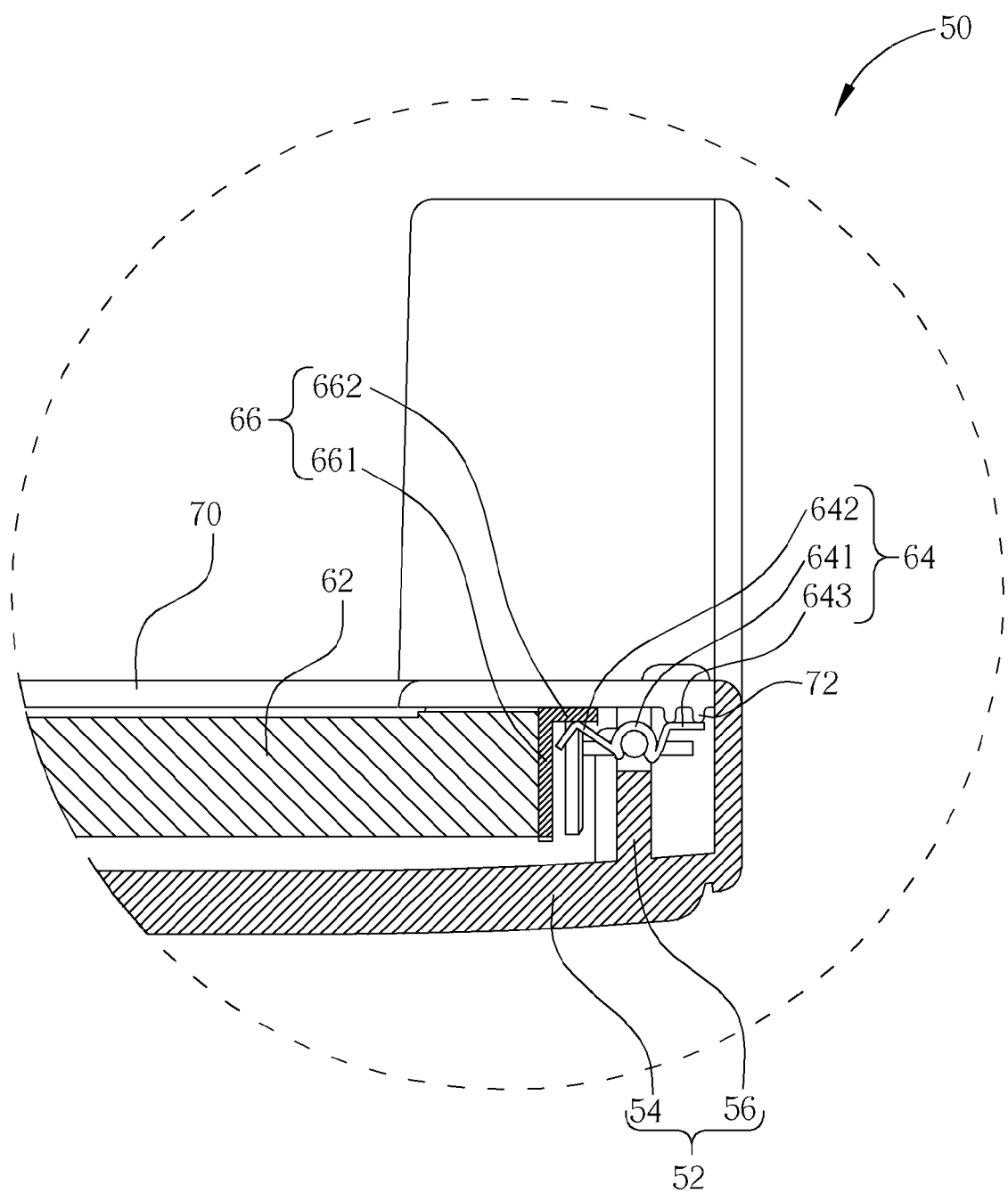
FIG. 5 is an enlarged diagram of FIG. 4.

Please refer to FIG. 2 to FIG. 5. FIG. 2 is a sectional view of the display device 50 when the frame 70 has not been assembled with the display panel 62 according to the preferred embodiment of the present invention. FIG. 3 is an enlarged diagram of FIG. 2. FIG. 4 is a sectional view of the display device 50 when the frame 70 is assembled with the display panel 62 according to the preferred embodiment of the present invention. FIG. 5 is an enlarged diagram of FIG. 4. At least one protrusion 72 is formed on the frame 70 and located in a position corresponding to the fragment component 64 and the rod 60. The fragment component 64 includes an annular part 641 for wedging with the rod 60, a first bending part 642 (a first end of the fragment component 64) connected to an end of the annular part 641, and a second bending part 643 (a second end of the fragment component 64) connected to other end of the annular part 641. Please refer to FIG. 1, FIG. 2, and FIG. 3. The fragment component 64 is wedged with the rod 60 on the lateral wall 56 first. Then the display panel 62 is installed inside the housing 52. At this time, the pressing part 662 of the supporting component 66 connected to the display panel 62 presses down the first bending part 642 of the fragment component 64 so that the annular part 641 of the fragment component 64 rotates around the rod 60 and the second bending part 643 of the fragment component 64 raises. Please refer to FIG. 4 and FIG. 5. The frame 70 is installed on the display panel 62, and the protrusion 72 of the frame 70 presses down the second bending part 643 of the fragment component 64. At this time, the first end of the fragment (the first bending part 642) and the second end of the fragment (the second bending part 643) are constrained and deformed elastically so as to provide elastic forces to the display panel 62 and frame 70 respectively as a buffer. The fragment component 64 is capable of absorbing shock force of the display panel 62 when the display device 50 is shocked.

In contrast to the prior art, the present invention utilizes the fragment component for absorbing shock force of the display panel. The fragment structure has characteristics of uniform cushion, a wide shock-absorbing range, simply assembly, low cost, and design flexibility for optimizing the shock-absorbing effect for customization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A shock-absorbing structure comprising:
   a housing comprising a base and a lateral wall connected to the base;
   a fragment component for wedging with the lateral wall, the fragment component comprising a first end and a second end;
   a supporting component connected to a display panel for pressing the first end of the fragment component; and
   a frame installed on a side of the display panel for covering the display panel with the housing and for pressing the second end of the fragment component so that the fragment component supports the display panel elastically.

2. The shock-absorbing structure of claim 1 wherein the base and the lateral wall are connected integratedly.

3. The shock-absorbing structure of claim 1 wherein a rod is disposed on the lateral wall and the fragment component is pivoted to the rod.

4. The shock-absorbing structure of claim 3 wherein the fragment component comprises an annular part for wedging with the rod.

5. The shock-absorbing structure of claim 4 wherein the fragment component further comprises:
   a first bending part connected to an end of the annular part, the supporting component being for pressing the first bending part of the fragment component; and
   a second bending part connected to other end of the annular part, the frame being for pressing the second bending part of the fragment component.

6. The shock-absorbing structure of claim 5 wherein a protrusion is formed on the frame for pressing the second bending part of the fragment component.

7. The shock-absorbing structure of claim 1 wherein the supporting component comprises:
   a connecting part connected to the display panel; and
   a pressing part connected to the connecting part for pressing the first end of the fragment component.

8. The shock-absorbing structure of claim 1 wherein the supporting component is screwed to the display panel.

9. The shock-absorbing structure of claim 1 wherein the supporting component and the display panel are connected integratedly.

10. The shock-absorbing structure of claim 1 wherein the supporting component is a metal frame or a plastic frame.

11. The shock-absorbing structure of claim 1 further comprising:
    a positioning component connected to the display panel; and
    a pin disposed on the base of the housing for inserting in the positioning component for constraining the display panel.

12. The shock-absorbing structure of claim 11 wherein the positioning component is screwed to the display panel.

13. The shock-absorbing structure of claim 11 wherein the positioning component and the display panel are connected integratedly.

14. A display device comprising:
    a housing comprising a base and a lateral wall connected to the base;
    a display panel installed inside the housing;
    a fragment component for wedging with the lateral wall, the fragment component comprising a first end and a second end;
    a supporting component connected to the display panel for pressing the first end of the fragment component; and
    a frame installed on a side of the display panel for covering the display panel with the housing and for pressing the second end of the fragment component so that the fragment component supports the display panel elastically.

15. The display device of claim 14 wherein a rod is disposed on the lateral wall and the fragment component is pivoted to the rod.

16. The display device structure of claim 15 wherein the fragment component further comprises:

an annular part for wedging with the rod;

a first bending part connected to an end of the annular part, the supporting component being for pressing the first bending part of the fragment component; and a second bending part connected to other end of the annular part, the frame being for pressing the second bending part of the fragment component.

17. The display device of claim 16 wherein a protrusion is formed on the frame for pressing the second bending part of the fragment component.

18. The display device of claim 14 wherein the supporting component comprises:

a connecting part connected to the display panel; and a pressing part connected to the connecting part for pressing the first end of the fragment component.

19. The display device of claim 14 further comprising:

a positioning component connected to the display panel; and a pin disposed on the base of the housing for inserting in the positioning component for constraining the display panel.

20. The display device of claim 14 wherein the base and the lateral wall are connected integratedly.

\* \* \* \* \*